US012513784B1

(12) United States Patent
Vernon et al.

(10) Patent No.: US 12,513,784 B1
(45) Date of Patent: Dec. 30, 2025

(54) SYSTEM AND METHOD FOR THERMAL ENERGY STORAGE

(71) Applicant: Orca Sciences LLC, Kirkland, WA (US)

(72) Inventors: Austin Blake Vernon, Kirkland, WA (US); James Williams, Kirkland, WA (US); Aravindh Rajan, Kirkland, WA (US); Ian Salmon McKay, Kirkland, WA (US)

(73) Assignee: Orca Sciences LLC, Kirkland, WA (US)

( * ) Notice: Subject to any disclaimer, the term of this patent is extended or adjusted under 35 U.S.C. 154(b) by 0 days.

(21) Appl. No.: 19/068,926

(22) Filed: Mar. 3, 2025

Related U.S. Application Data

(60) Provisional application No. 63/560,715, filed on Mar. 3, 2024.

(51) Int. Cl.
*H05B 3/42* (2006.01)

(52) U.S. Cl.
CPC .................................... *H05B 3/42* (2013.01)

(58) Field of Classification Search
None
See application file for complete search history.

(56) References Cited

U.S. PATENT DOCUMENTS 2,908,331 A * 10/1959 Brown .................. E21B 36/005 166/61
3,757,860 A * 9/1973 Pritchett ............. E21B 43/2401 166/302
4,361,135 A * 11/1982 Metz ....................... F24T 10/17 126/400
4,570,715 A * 2/1986 Van Meurs ............ E21B 19/22 219/415
4,715,429 A 12/1987 Mogensen
5,181,797 A * 1/1993 Circeo, Jr. ................ E02D 3/11 405/234

(Continued)

FOREIGN PATENT DOCUMENTS

GB 2575858 A 1/2020
GB 2580620 A 7/2020

(Continued)

OTHER PUBLICATIONS

Caltex, "Coolant system maintenance: A question of balance" { https://www.caltex.com/my/business-solutions/articles/coolant-system-maintenance-balancing.html#:~:text=A%20mixture%20of%2060%25%20ethylene,C%20(260° F).}.*

(Continued)

*Primary Examiner* — Thor S Campbell
(74) *Attorney, Agent, or Firm* — Jeffrey Schox; Randy Mehlenbacher

(57) ABSTRACT

A system can include: a heat storage medium (e.g., soil, dirt, gley, sand, earth, bedrock, gravel, clay, silt, loam, rock, talus, scree, volcanic material, glacial debris, humus, and/or other earthen material), a heat transfer mechanism (e.g., resistive heater, inductive heater, forced air heater, forced fluid heater, etc.), and a heat output mechanism (e.g., thermoelectric device, fluid coupling, etc.). A method can include heating a heat storage medium with a heat transfer mechanism and extracting heat from the heat storage medium using a heat transfer mechanism.

9 Claims, 14 Drawing Sheets

(56) References Cited

U.S. PATENT DOCUMENTS

| | | | | |
|---|---|---|---|---|
| 5,244,310 | A | 9/1993 | Johnson | |
| 8,355,623 | B2 * | 1/2013 | Vinegar | E21B 43/38 392/301 |
| 8,584,734 | B2 * | 11/2013 | Shimozono | F01K 3/00 165/10 |
| 9,695,748 | B2 | 7/2017 | Kreuger | |
| 9,709,337 | B2 * | 7/2017 | Pilebro | F28D 20/0052 |
| 10,641,073 | B2 * | 5/2020 | Curlett | E21B 28/00 |
| 10,845,129 | B2 * | 11/2020 | Sakai | F24T 10/20 |
| 11,499,785 | B2 * | 11/2022 | France | F28D 7/0066 |
| 11,655,697 | B2 * | 5/2023 | Curlett | E21B 28/00 166/65.1 |
| 11,982,145 | B2 * | 5/2024 | Wiener | E21B 7/124 |
| 12,222,167 | B2 * | 2/2025 | Isaksson | F28D 20/0052 |
| 2002/0018697 | A1 | 2/2002 | Vinegar et al. | |
| 2006/0021752 | A1 * | 2/2006 | de St. Remey | E21B 36/04 166/302 |
| 2007/0193747 | A1 * | 8/2007 | de St. Remey | E21B 43/2401 166/302 |
| 2008/0078551 | A1 * | 4/2008 | DeVault | E21B 36/04 166/302 |
| 2008/0230219 | A1 * | 9/2008 | Kaminsky | E21B 43/305 166/248 |
| 2009/0179429 | A1 * | 7/2009 | Ellis | F03G 6/066 60/671 |
| 2009/0260824 | A1 * | 10/2009 | Burns | E21B 36/04 166/57 |
| 2010/0258309 | A1 * | 10/2010 | Ayodele | E21B 36/04 166/272.3 |
| 2010/0282460 | A1 * | 11/2010 | Stone | E21B 43/2401 700/29 |
| 2011/0016898 | A1 | 1/2011 | Ghesquiere et al. | |
| 2016/0340850 | A1 * | 11/2016 | Lisin | E02D 31/14 |
| 2019/0360276 | A1 | 11/2019 | Davis | |
| 2020/0011573 | A1 * | 1/2020 | Graham | F24T 10/17 |
| 2020/0393166 | A1 * | 12/2020 | Eslami-Nejad | F28D 7/06 |
| 2021/0098143 | A1 * | 4/2021 | Trojer | G21C 5/10 |

FOREIGN PATENT DOCUMENTS

| | | | |
|---|---|---|---|
| JP | 7218147 | B2 | 1/2023 |
| KR | 101166684 | B1 | 7/2012 |
| SE | 544793 | C2 | 11/2022 |

OTHER PUBLICATIONS

"Ground Source Heating and Cooling, On Site Renewable Heat—Seasonal Heat Storage", ICAX, Interseasonal Heat Transfer, first downloaded Feb. 8, 2025.

"Low-temperature thermal energy storage", International Renewable Energy Agency, first downloaded Feb. 8, 2025.

"Renewable Energy for Residential Heating and Cooling", IEA Implementing Agreement on Renewable Energy Technology Deployment Policy Handbook, Earthscan, 2011.

Alimonti, et al., "Study of geothermal power generation from a very deep oil well with a wellbore heat exchanger", Renewable Energy 86 (2016) 292-301.

Delage, et al., "On the thermal impact on the excavation damaged zone around deep radioactive waste disposal", Journal of Rock Mechanics and Geotechnical Engineering 5 (2013) 179-190.

Gehlin, Signhild, "Thermal Response Test—In Situ Measurements of Thermal Properties in hard Rock", Licentiate thesis, Luleå University of Technology, ISSN 1402-1757, 1998.

Loria, et al., "Thermally induced deformation of soils: a critical overview of phenomena, challenges and opportunities", Journal Pre-proof, to appear in: Geomechanics for Energy and the Environment, Feb. 13, 2020.

MidttØmme, et al., "Status of Utes in Norway", Geological Survey of Norway, NGU, first downloaded Feb. 8, 2025.

Paksoy, et al., "Aquifer Thermal Energy Cold Storage System at Richard Stockton College", first downloaded Feb. 8, 2025.

Stene, et al., "Design and Operation of Ground-Source Heat Pump Systems for Heating and Cooling of Non-Residential Buildings", 9th International IEA Heat Pump Conference, May 20-22, 2008, Zurich, Switzerland.

Stene, Jørn, "Large-scale ground-source heat pump systems in Norway", IEA Heat Pump Programme, Annex 29. Workshop, May 19, 2008.

Stene, et al., "Residential CO2 Heat Pump System for Combined Space Heating and Hot Water Heating", Thesis submitted in partial fulfilment of the requirements for the Degree of Doktor Ingeniør NTNU—Norwegian University of Science and Technology Faculty of Engineering Science and Technology Department of Energy and Process Engineering, Feb. 2004.

Wong, et al., "Recent Inter-seasonal Underground Thermal Energy Storage Applications in Canada", 2006 IEEE EIC Climate Change Conference, Ottawa, ON, Canada, 2006, pp. 1-7, doi: 10.1109/EICCCC.2006.277232.

* cited by examiner

FIGURE 10A
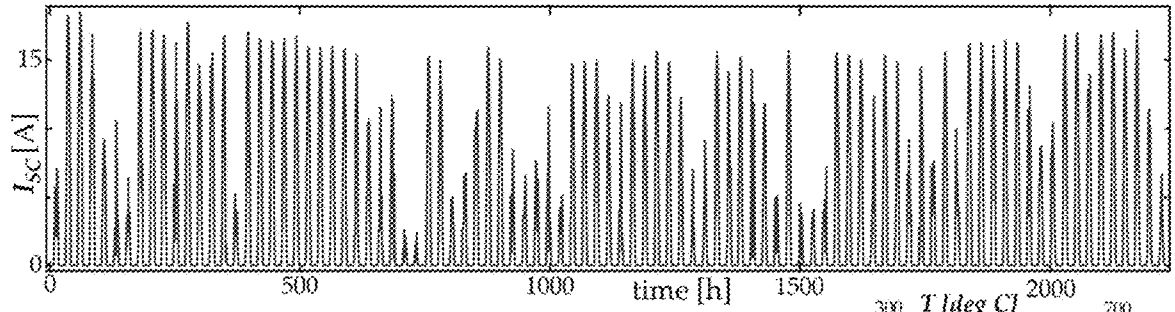
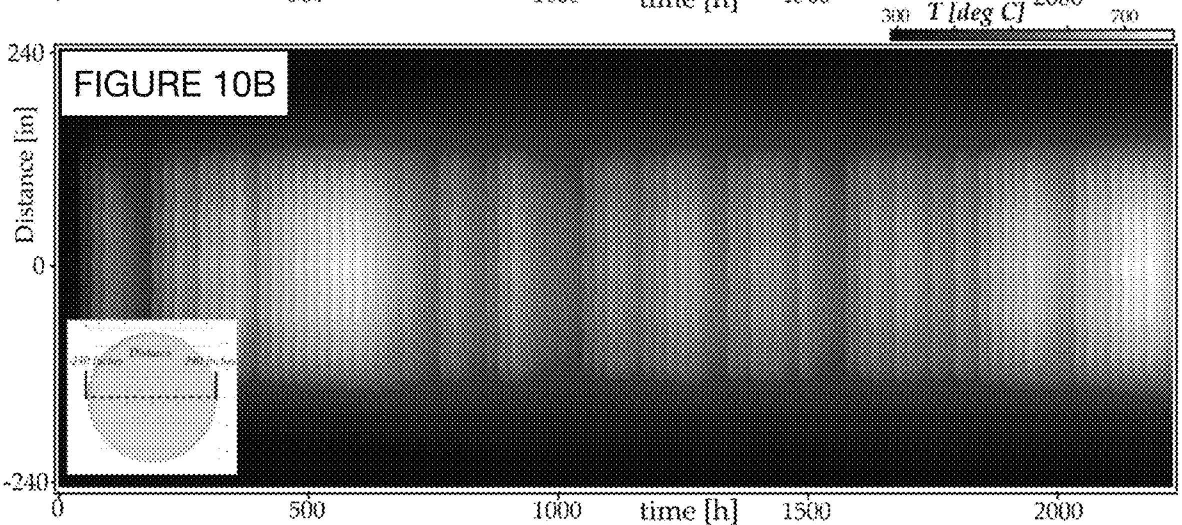
FIGURE 10B
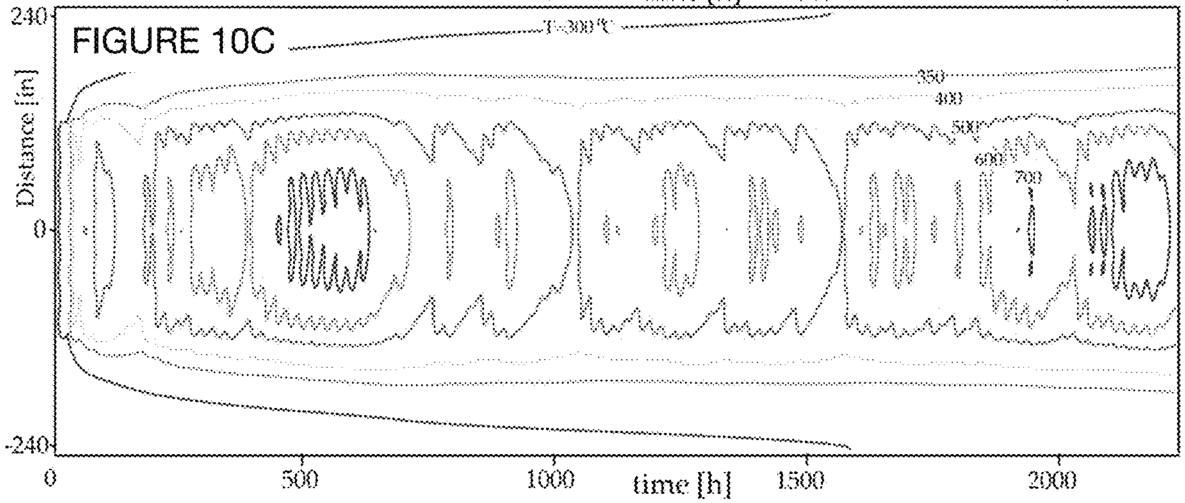
FIGURE 10C

SYSTEM AND METHOD FOR THERMAL ENERGY STORAGE

CROSS-REFERENCE TO RELATED APPLICATIONS

This application claims the benefit of U.S. Provisional Application No. 63/560,715 filed 3 Mar. 2024, which is incorporated in its entirety by this reference.

TECHNICAL FIELD

This invention relates generally to the thermal energy storage field, and more specifically to a new and useful system and method in the thermal energy storage field.

BRIEF DESCRIPTION OF THE FIGURES

FIG. 10*a* shows an example of an hourly solar current (ISC) for an approximately 3-month time span during winter. FIG. 10*b* shows an example of a temperature along a cut through the center of a heating array (cut shown as a dashed line in the inset figure) over the course of the 3-month time span shown in FIG. 10*a*. FIG. 10*c* is a contour plot showing T=300,400,500,600 and 700 degrees Celsius contours for an exemplary heating array over the approximately 3-month time span shown in FIG. boa.

DETAILED DESCRIPTION

The following description of the embodiments of the invention is not intended to limit the invention to these embodiments, but rather to enable any person skilled in the art to make and use this invention.

1. Overview

Figure 1:
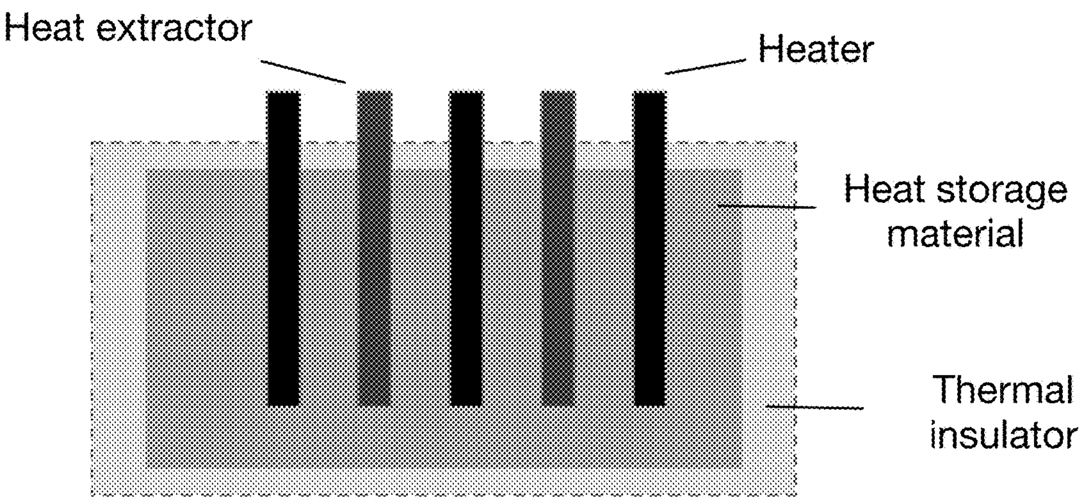
FIG. 1 is a schematic representation of an example of the system.

As shown in FIG. 1, a system can include a thermal storage medium, an optional insulator (e.g., thermal insulator, electrical insulator, etc.), one or more heaters, and one or more heat exchangers.

Figure 2:
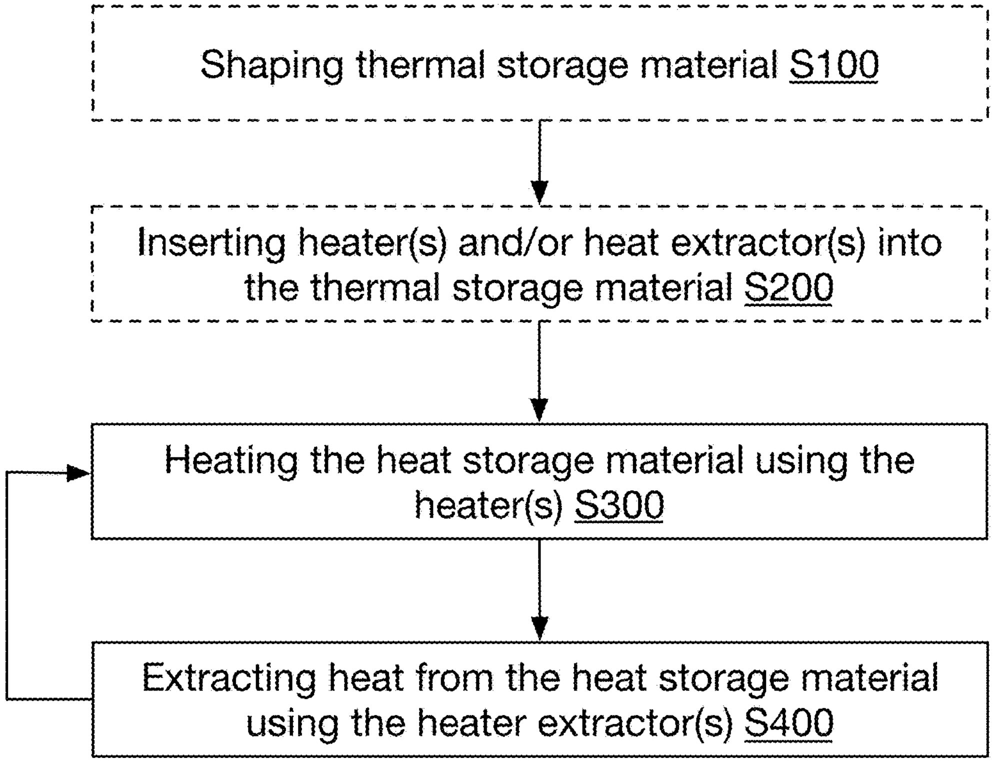
FIG. 2 is a flow chart representation of an example of the method.

As shown in FIG. 2, a method can include optionally shaping a thermal storage medium (and/or insulator), optionally introducing the heaters and/or heat exchangers into the thermal storage medium, and iteratively: heating the thermal storage medium using the heater(s) and extracting heat from the thermal storage medium using the heat exchanger(s).

The system and method preferably function to store energy (e.g., electricity) in the form of thermal energy, where the thermal energy can subsequently be extracted to provide energy (e.g., as steam, as electricity, as a means for increasing temperature, etc. such as when energy is not available, when insufficient energy is available, etc.). As a specific example, the system and/or method can be used to provide local energy storage (e.g., for a building, construction or other job site, municipality such as a city, industrial facility, etc.). The system and/or method are preferably used to store renewable energy (e.g., from wind, solar, nuclear, tidal, etc. sources) such that during periods when the renewable energy is not as available (e.g., night, low wind, etc.) and/or provides insufficient energy, the system and/or method can provide back-up or supplemental energy. However, the system can be used for storing energy produced via non-renewable sources. In some variants, the system and/or method can be beneficial for storing and providing energy across seasonal variations (e.g., to account for changes in available sunlight on a time-scale of months or seasons, to account for seasonal variability in wind, to account for seasonal variability in weather such as cloud cover, etc.). However, the system and/or method can be used for daily energy balancing and/or any suitable time scale (e.g., iteration time). While varying a volumetric space effectively occupied by the system can enable tuning across a range of energy storage scales, an exemplary embodiment of the system can enable storage and extraction of between 100 kW and 1 MW of energy.

2. Technical Advantages

Variants of the technology can confer one or more advantages over conventional technologies.

First, variants of the technology can enable low-cost energy storage and energy extraction. For example, by using readily available materials as thermal storage medium, significant cost savings can be realized. In another example, the system can be formed during routine construction and/or maintenance projects thereby minimally increasing a project cost (e.g., by avoiding an isolated instantiation of the method). In some examples, by leveraging renewable resources, the resulting system can be cheaper than using nonrenewable resources (e.g., as the nonrenewable resources need not be shipped in to provide heat).

Second, variants of the technology can be selected to improve the amount of energy stored and/or duration of time the energy is stored. For instance, as thermal energy storage density and heat transfer improve with higher temperatures while heat loss decreases with larger storage volumes, the inventors have found enhanced thermal energy storage conditions by using high temperatures (e.g., 100-1000° C.) in large volumes (e.g., on the order of about 1000 $ft^3$ or larger) to limit heat loss while maximizing storage density and heat transfer. However, other operating conditions may be able to achieve similar results (e.g., using more heaters, using different heat types, etc.)

However, further advantages can be provided by the system and method disclosed herein.

4. System

As shown in FIG. 1, a system can include a thermal storage medium, an optional insulator (e.g., thermal insulator, electrical insulator, etc.), one or more heaters, and one or more heat exchangers. The system preferably functions to store energy (e.g., electricity) in the form of thermal energy, where the thermal energy can subsequently be extracted to provide energy (e.g., as steam, as electricity, as a means for increasing temperature, etc. such as when energy is not available, when insufficient energy is available, etc.). While the system is scalable to practically any energy scale (e.g., by increasing a volume occupied, number of heaters, etc.), specific variants of the system can be particularly advantageous for storing between about 100 kW and 500 MW (e.g., 200 kW, 500 kW, 1 MW, 2 MW, 5 MW, 10 MW, 20 MW, 50 MW, 100 MW, 200 MW, 500 MW, values or ranges therebetween, etc.). These systems can be connected to one another to enable greater energy storage (e.g., two 500 MW systems can be coupled, collocated, etc. to result in a 1 GW energy storage).

The system is preferably powered using renewable energy sources (e.g., solar panels, windmills, tidal energy collection, nuclear power sources, etc.). In some variants, the system can include the renewable energy source (e.g., off the electrical grid or connected to the electrical grid). As one such illustrative example, the system can include a solar panel array where the solar panels convert sunlight into electricity which is then converted into thermal energy by the heaters, where the thermal energy can then be stored within the energy storage material. However, the system can be grid connected, can be powered using nonrenewable energy sources, and/or can otherwise be powered.

Electricity can be provided to the heater(s) as a direct current (e.g., DC) and/or as an alternating current (e.g., AC). DC is preferred for variants using resistive heaters. AC is preferred for variants using inductive heaters. In variants using AC, a frequency at which the current changes direction is preferably between 50-2000 Hz (or any suitable value or subrange contained therein such as 60 Hz, 100 Hz, 120 Hz, 240 Hz, 300 Hz, 500 Hz, 750 Hz, 1000 Hz, 1500 Hz, etc.). However, other suitable frequencies could be used.

The thermal storage medium preferably functions to retain and release thermal energy. The thermal storage medium can also act as a support for, protection for, and/or can otherwise interface with the heater(s) (e.g., heater array, set of heaters, etc.) and/or heat extractor(s). However, the thermal storage medium can otherwise function.

The thermal storage medium preferably has a modest thermal conductivity (or more generally thermal diffusivity or thermal transmittance). When the thermal conductivity is too high, heat can be readily removed from the thermal storage medium (e.g., via conduction). When the thermal conductivity is too low, injection of heat into and removal of heat from the thermal storage medium can be inefficient. In a preferred variant, the thermal conductivity is preferably between about 0.1 and 10 W/(m*K). However, the thermal storage material can have a higher or lower thermal conductivity in some variants (e.g., for specific applications).

Relatedly, the thermal storage material (also referred to as thermal storage media) preferably has a low coefficient of thermal expansion, which can be beneficial for minimizing changes in thermal contact between components of the system during heating and cooling of the thermal storage material. For instance, the coefficient of thermal expansion is preferably less than about $5\times10^{-5}$/K. However, in some variants, a coefficient of thermal expansion greater than $5\times10^{-5}$/K can be used (e.g., a system operating over a narrow temperature range within a window of operability).

In one preferred embodiment, a temperature of the thermal storage media (at a hottest temporospatial point of the thermal storage media) is preferably between about 100° C. and 1000° C. This can set a limit on potential thermal storage media as the material needs to be able to withstand such a temperature range (e.g., without significant deformation, phase change, etc.). In some variants, the temperature of the thermal storage medium can cycle between the temperature limits (e.g., daily, weekly, monthly, seasonally, yearly, during maintenance cycles, etc.). However, the temperature can alternatively cycle primarily over a subset of the temperature ranges (e.g., 300-600° C., 100-500° C., 500-700° C., 600-1000° C., 100-600° C., 200-1000° C., etc. as shown for example in FIG. 10*a*, FIG. 10*b*, or FIG. 10*c*).

The thermal storage medium is preferably an earthen material. Exemplary thermal storage media include, but are not limited to: soil, dirt, gley, sand, earth, bedrock, gravel, clay, silt, loam, rock, talus, scree, volcanic material, glacial debris, humus, rock, ore, mineral, mineraloid, aggregate, and/or other suitable geologic material. However, other thermal storage media could be used (e.g., organic materials, inorganic materials).

An optional insulator can function to provide electrical and/or thermal isolation of the mass of thermal storage medium from surrounding media or materials. The insulator preferably has a lower thermal conductivity than the thermal storage media. However, additionally or alternatively, the insulator can have a higher specific heat capacity than the thermal storage media and/or can have other suitable thermal properties relative to the thermal storage media (such that heat is preferably retained within the thermal storage media and only slowly dissipates through the insulator). Note that the thermal behavior of earthen material can be modified and/or controlled by tuning one or more of: porosity (e.g., aeration, density), water content, bulk density, texture, minerology, organic matter content, structure, temperature, and/or other tuning parameters. Thus, an insulator can be formed by tuning one or more of these properties such that a relatively insulating layer is formed (relative to a thermal storage medium).

The insulator typically partially or fully surrounds (e.g., encompasses) the thermal storage medium. As a first example, an insulator can bound the system (e.g., act as the interface defining the edge of the system relative to surrounding media on all sides). As a second example, an insulator can surround a perimeter encompassing the heaters (but optionally not above or below the heaters). As a third example, an insulator can be on top of and/or below the thermal storage medium (e.g., particularly, but not exclusively, when the thermal storage medium is formed into a mound). However, other suitable insulator arrangements can be achieved.

The insulator can be the same material as the thermal storage medium and/or a different material. In a first specific example, the insulator can be an aerated or other low-density (where low density references density relative to the thermal storage medium) soil (or other earthen material) while the thermal storage material can be compacted soil or other earthen material. In a second specific example, the insulator can be a hydrated (e.g., damp, wet, etc.) earthen material and the thermal storage material can be a dry earthen material (e.g., the same earthen material without significant amount of water). In a third specific example, the insulator can be soil and/or soil organic matter and the thermal storage material can be clay. In a fourth specific example, straw, sawdust, and/or other low-density materials (e.g., lower density than the thermal storage material) can be used as an insulation layer. However, other suitable insulator and thermal storage media combinations can be used.

The one or more heaters function to inject heat into the thermal storage media. The heaters preferably convert electricity into thermal energy (and thus are typically highly efficient). The heaters can operate using Joule heating (e.g., resistive heating), inductive heating, convective heating, conductive heating, radiative heating, and/or using any suitable heating mechanism.

The heater(s) are preferably embedded within the thermal storage media. The heater(s) are preferably embedded at most about 30 ft (e.g., 5 ft, 10 ft, 15 ft, 20 ft, 25 ft, 29 ft, 33 ft, values or ranges therebetween, etc.) into the thermal storage media (e.g., as distances greater than about 30 ft can enter the water table, as drilling into or piling earthen material greater than about 30 ft can present geological or construction challenges, etc.). However, the heater(s) can be embedded deeper than 30 feet (e.g., the heaters could be embedded into bedrock which can be hundreds or even thousands of feet deep). As a specific example, the heaters can be embedded in about 10 feet of thermal storage media.

However, additionally or alternatively, the heaters can be arranged on a surface of the thermal storage media and/or can otherwise be in thermal communication with the thermal storage media.

In preferred embodiments, a plurality of heaters (e.g., individual heating elements, distinct heating elements) are used. The plurality of heaters can include between 2 and 1000 heaters. In one illustrative example (e.g., to achieve about 100 kW of energy storage), a heater array can include 18 heaters (e.g., arranged in an 18×1 line, a 9×2 grid, a 6×3 grid, a 4-5-5-4 grouping, a 1-3-5-5-3-1 grouping, a 2-4-6-8 grouping, or other grouping, array, or grid). In variations of this illustrative example (e.g., to achieve greater energy storage capacity), a plurality of heater array can be used, where each heater array is electrically isolated from (or in indirect electrical communication with) other heater arrays and each heater array includes 18 heaters. However, a heater array can directly include additional heaters and/or can be in any suitable electrical communication.

Figure 7A:
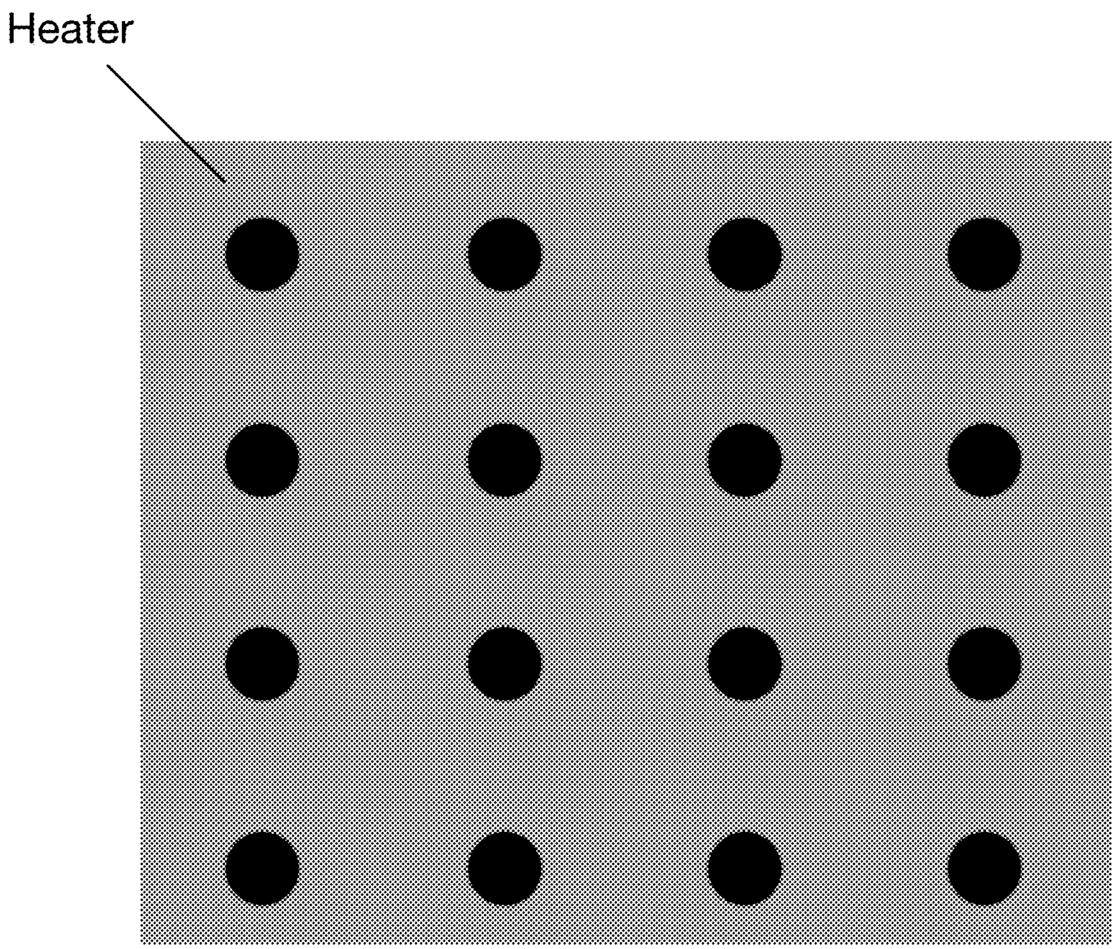
FIGS. 7A-7C are schematic representations of top-down views of exemplary heater arrangements.
Figure 7B:
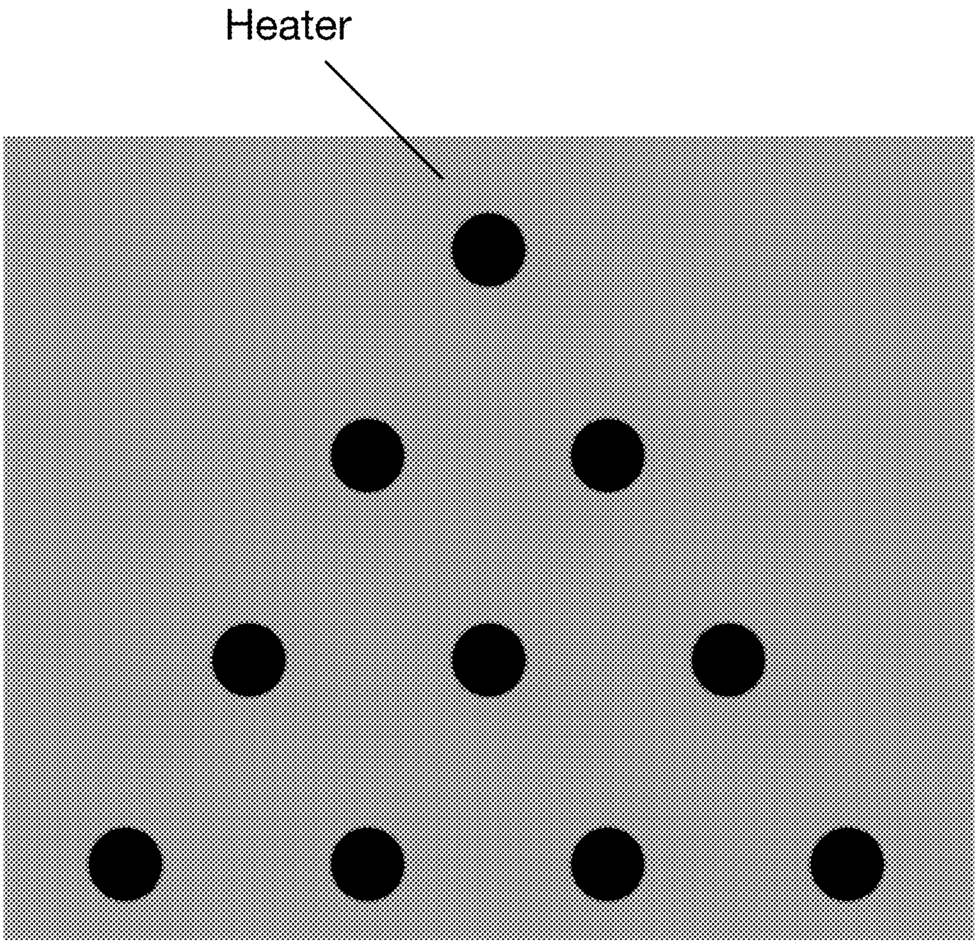
Figure 7C:
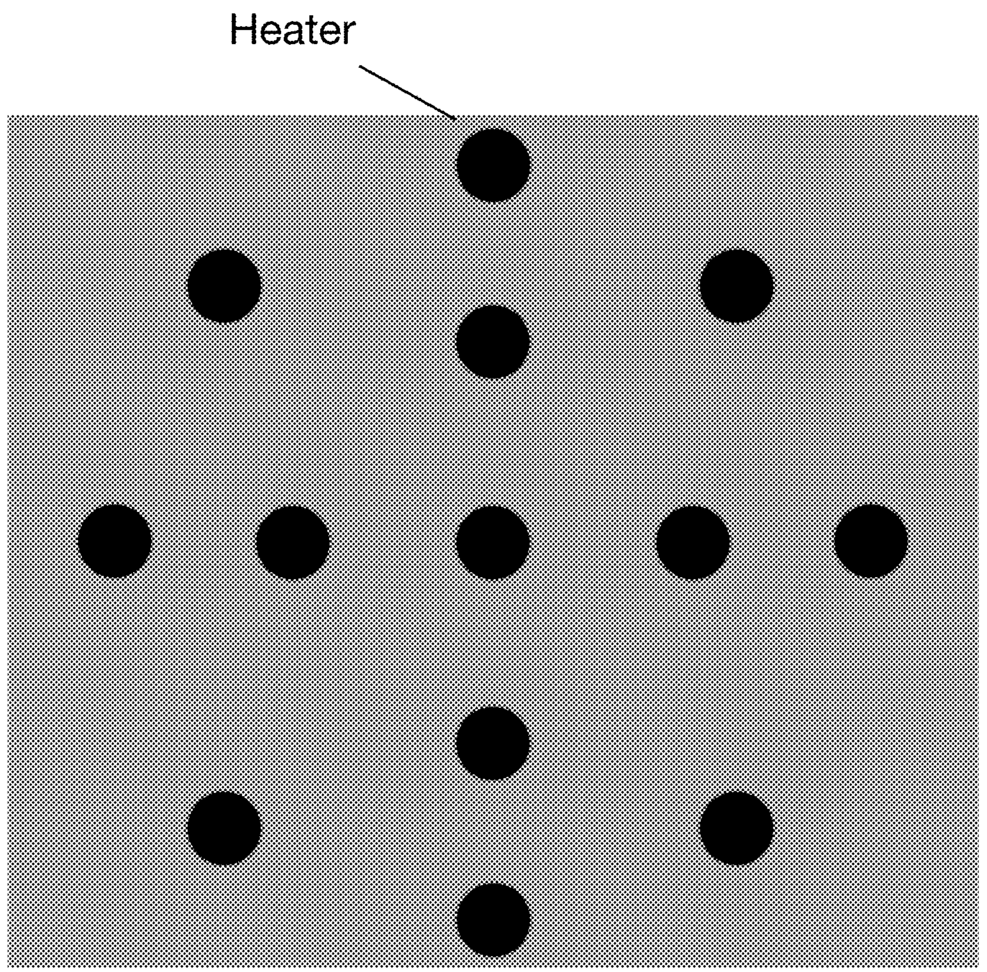
Figure 8:
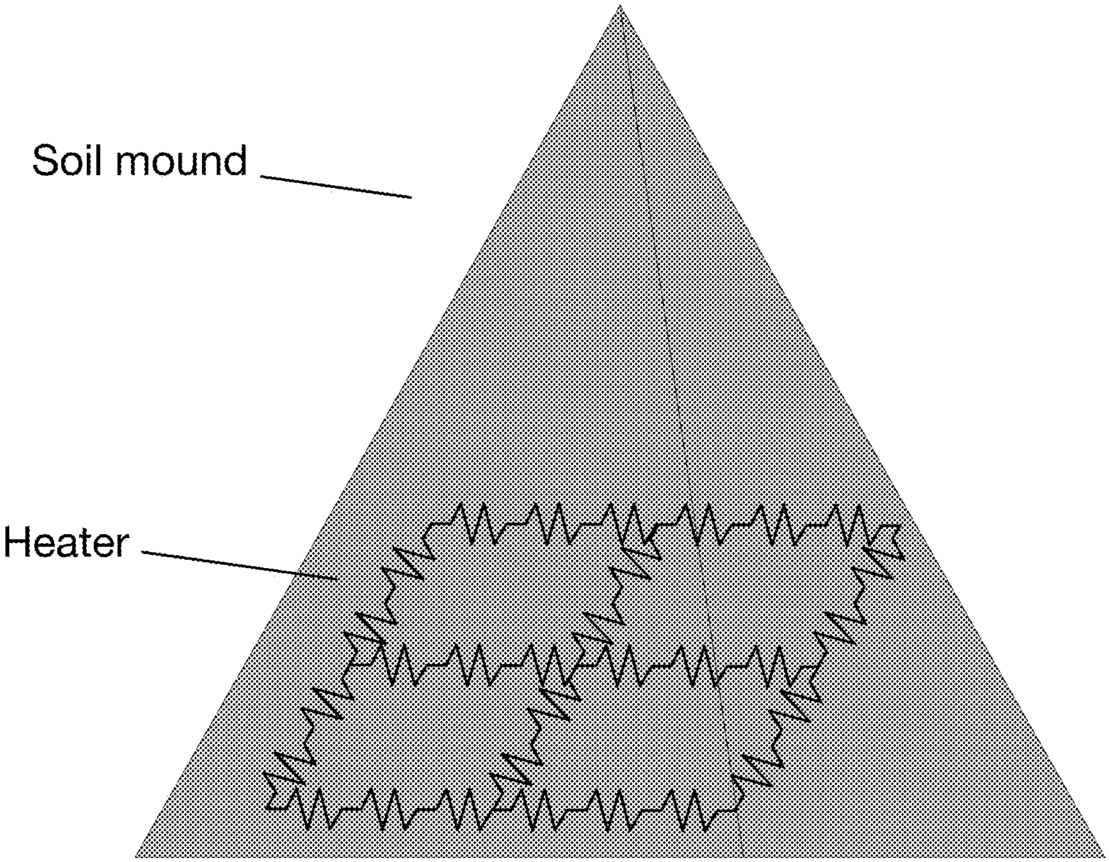
FIG. 8 is a schematic representation of an example of a soil mound built on top of a heater.
Figure 9:
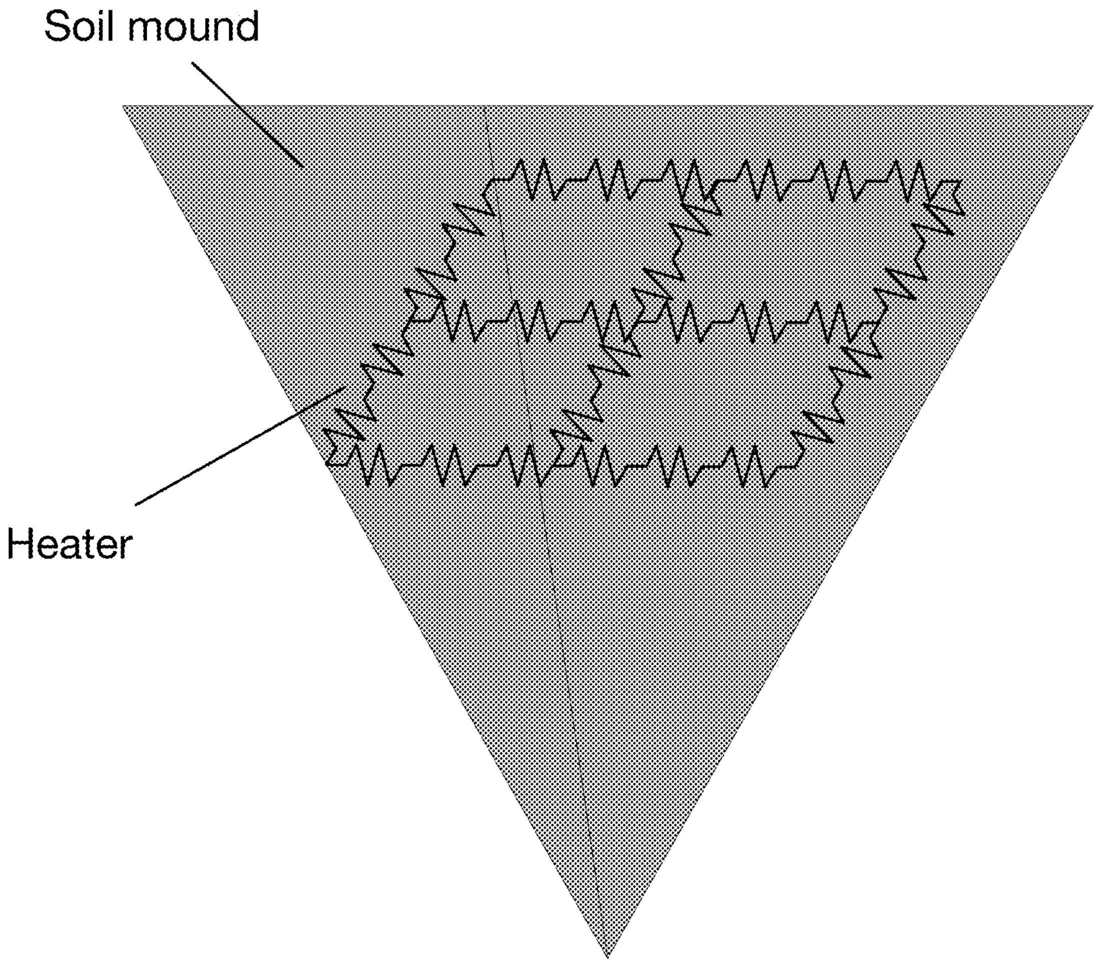
FIG. 9 is a schematic representation of an example of a below grade "soil mound" with a heater integrated within the "soil mound."

When a plurality of heaters are used, the heaters can be arranged on a rectilinear grid (e.g., rectangular grid, square grid, diamond grid, parallelogram grid, etc. such as shown for example in FIG. 7A), a curvilinear grid (e.g., circular grid, elliptical grid, parabolic grid, hyperbolic grid, etc. such as shown for example in FIG. 7C), irregularly place, and/or can be arranged in any manner. The plurality of heaters can be arranged in a 1D arrangement (e.g., in a line), in a 2D arrangement (e.g., in a plane, as shown for example in FIG. 7A, FIG. 7B, or FIG. 7C), and/or in a 3D arrangement (e.g., within a volume, as shown for example in FIG. 8 or FIG. 9). The heaters can be in series (e.g., electrically connected in series), in parallel (e.g., electrically connected in parallel), and/or can be electrically isolated (e.g., each heater connected separately to an electricity source or sources). A bounding shape surrounding the plurality of heaters can be polygonal (e.g., as shown in FIG. 7A or FIG. 7B), curved (e.g., as shown for example in FIG. 7C, circular, annular, elliptical, etc.), and/or can have any other suitable shape (e.g., based on space available at a site where the system is to be installed). As a specific example, chicken wire (or other similar mesh metal or conductive wires) can be used as a heating element (e.g., a resistive heater).

The heaters typically reach or exceed the maximum temperature of the thermal storage medium. For instance, to achieve a thermal storage medium temperature of about 1000° C., the heaters must at least achieve 1000° C. and typically need to be hotter (e.g., to account for thermal losses from the system).

A separation distance between adjacent heaters is typically correlated with a maximum temperature that is achieved in the thermal storage medium and/or an amount of "charging" time required to achieve the maximum temperature. However, the separation distance can also depend on the heater performance (e.g., how much heat a heater can provide in a given amount of time), heater stability (e.g., heater safe operating temperature), and/or other suitable properties. When the heaters are too close together, the thermal storage media can be heated to a temperature exceeding a safe or reasonable working temperature. The inventors have found that for many earthen materials, a minimum separation distance between nearest neighboring heaters is preferably about 2 ft (e.g., 3 ft, 5 ft, 7 ft, 10 ft, 15 ft, etc.). However, other variants can use smaller separation distances (e.g., using less efficient heaters, using heaters that can achieve a lower total heating, etc.). This distance is typically radially symmetric (i.e., the same for all nearest neighbors). However, the distance can be different for different nearest neighbors (e.g., nearest neighbors in one axis can be closer than nearest neighbors along a second axis such as because of anisotropy in the thermal properties of the thermal storage medium, to accommodate space for heat extractors, etc.).

However, in some embodiments, a single heater can be sufficient.

The heater(s) preferably include a conduit (e.g., a protective tubing surrounding electrical wiring and/or the electrical element that generates heats). The conduit can provide a technical advantage for facilitating insertion and/or removal of heaters (e.g., to repair a faulty heater such as without requiring the heaters to be dug up to be removed). Typically, the conduit is rigid. However, flexible conduit can be used (in addition to or as an alternative to rigid conduit. As a specific example, the conduit can be formed from metal (e.g., coated steel, stainless steel, aluminium, galvanized steel, etc.). However, other suitable conduit materials can be used (e.g., plastic, polyvinyl chloride, polyethylene, polystyrene, reinforced thermosetting resin, fiberglass, fiber, fired clay, etc.).

The space between the conduit and the electrical elements is preferably filled with a fill material (e.g., particles, aggregates, agglomerates, granules, pebbles, a material with a Krumbein phi scale value less than about −6, etc.). The fill material can function to protect the electrical elements from reactions (e.g., with the conduit, with water, etc.), can improve thermal conduction from the electrical element to the conduit and into the thermal storage material, can improve drainage within the conduit, and/or can otherwise function. As a specific example, sand can be used as fill material. However, other (preferably electrically insulating) ceramic materials (e.g., alumina, zirconia, titania, silica, diamond, etc.) and/or other suitable materials can be used (e.g., plastic beads, earthen material, etc.). In another specific example, a dielectric fluid (e.g., gases such as air, inert gas, sulfur hexafluoride, nitrogen, neon, xenon, krypton, radon, mixtures thereof, etc.; liquids such as mineral oil, hexane, heptane, silicone oil, synthetic ester, purified water, hydrofluoroethers, fluorinated ketone, perfluorinated compounds, perchlorinated compounds, castor oil, chlorofluorocarbons, mixtures thereof, etc.; vacuum; etc.) can be used as the fill material. However, the space can remain empty (e.g., the fill material can be air or other gases).

The conduit size (e.g., diameter, diagonal, length, width, etc.) is preferably between about 2 inches and 60 inches (e.g., 5 in, 10 in, 12 in, 15 in, 18 in, 24 in, 30 in, 36 in, 40 in, 48 in, values or ranges therebetween, etc.). However, other conduit sizes can be used. The conduit wall thickness is typically between about 5 mm and 15 mm. However, other conduit thickness can be used. The conduit cross-sectional shape (e.g., in a plane substantially perpendicular to a gravity vector, along a plane intersecting the shortest dimensions of the conduit, perpendicular to an insertion axis, etc.) is typically circular or elliptical. However, other cross-sectional shapes can be used (e.g., polygonal). In different variants, the conduit can be a closed tube (e.g., a tube with an opening on one end and closed on the other end, a tube that is closed or sealed on both ends) and/or an open tube (e.g., a tube with an opening on both ends).

The heaters can fill the entire length of the conduit and/or can fill a portion of the conduit length. The heating region is preferably at the bottom of the conduit (relative to a gravity vector). However, the heating region can include any suitable region or portion of the conduit. For example, approximately half of the electrical heater can be an electrical lead and approximately half of the heater can be an electrical heating element (e.g., resistor, inductor, etc.). However, the electrical heating element can be any suitable fraction (up to 100% of) the conduit (e.g., where electrical leads are only present leading into the conduit). In some variations, the fill material can only cover the electrical heating element. In other variations, the fill material can fully fill the conduit volume.

Figure 4:
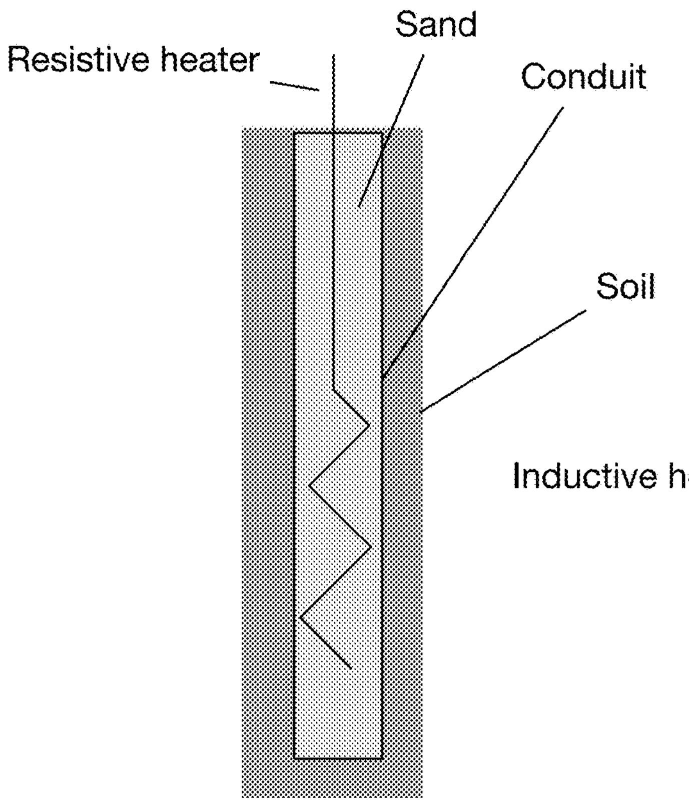
FIG. 4 is a schematic representation of a cross-sectional view showing an exemplary embodiment of a single resistive heater used in the system.

In one embodiment, the electrical elements can include one or more resistor (e.g., the heaters can be resistive heaters as shown for example in FIG. 4). In such an embodiment, the resistive heaters can include a conduit surrounding a resistor. The resistor can be made of a metal, alloy (e.g., Kanthal, FeCrAl, NiChrome, titanium-alloy, stainless steel, Chromel, Constantan, Hastelloy, Inconel, Incoloy, Monel, Nimonic, Stellite, Talonite, Vitallium, Brightray, Cupronickel, brass, bronze, superalloy, etc.), conductive ceramic (e.g., SiC foam), and/or other suitable material(s). The resistor is preferably coated with a protective coating (e.g., passivating coating) that can function to improve a mechanical resilience of the resistor; chemical resilience of the resistor; increase an electrical resistance between the resistor and the fill material, conduit, or thermal storage media; and/or can otherwise function. The protective coating is preferably a ceramic coating. However, other coating materials can be used. As a specific example, an alumina coating can be used (where the alumina can be a native alumina, a monolayer of alumina, a 1-100 nm thick coating, etc.). However, other protective coatings (e.g., oxides such as titania, ceria, yttria, ytterbia, lutetia, erbia, zirconia, silica, etc.; nitrides; oxynitrides; etc.) and/or a plurality of protective coatings (e.g., layers of protective coatings) can be used (with similar thickness as that for an alumina coating). The resistive element can be linear, U-shaped, boustrophedonic or W-shaped, spiral shaped, combinations thereof (such as including a linear heating region and a spiral heating region), and/or can have any suitable shaped or design.

Figure 5:
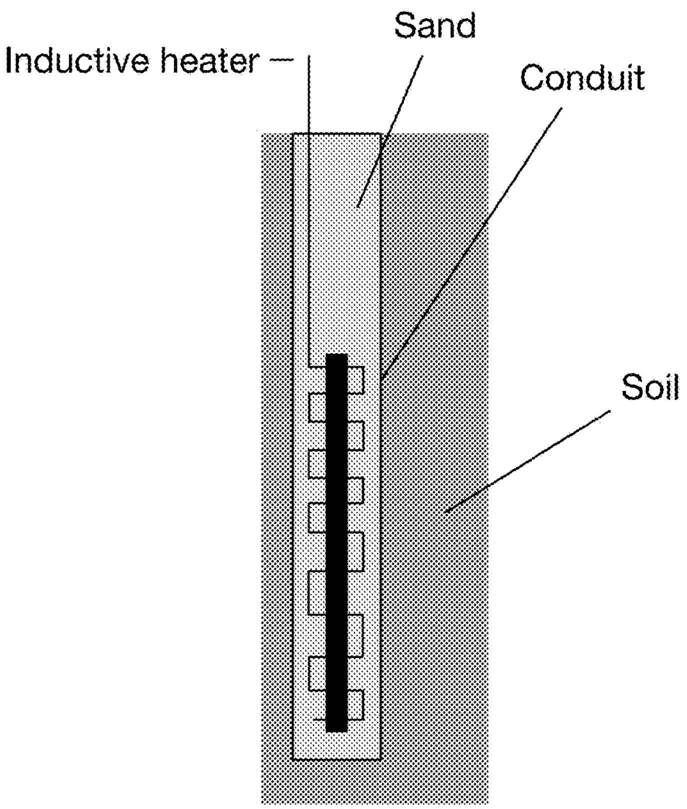
FIG. 5 is a schematic representation of a cross-sectional view of an exemplary embodiment of a single inductive heater used in the system.

In a second embodiment, the electrical elements can include one or more inductor (e.g., the heaters can be inductive heaters as shown for example in FIG. 5). In such an embodiment, the inductive heaters can include a conduit surrounding a wire coil with a metal core within the wire coil. Unlike typical inductive heaters, the conduit in these embodiments is preferably made of metal as a metal conduit will be heated (which will in turn introduce additional heat into the thermal storage media) by magnetic fields emanating outside the wire coil and thus can improve the total efficiency of the system (typical inductive heaters are only trying to heat the core and want to avoid heating of a conduit). However, the conduit can be made of other suitable materials (e.g., as described above). The wire coil is preferably made of a metal (such as aluminium, copper, steel, high-strength alloys, etc.). The wire coil can be coated (e.g., silver plated, nickel plated, tinned, insulated, a thermoplastic sheath, barrier or protective coating such as described for a resistor in the above embodiment, etc.) or bare. However, other suitable wire coils (e.g., made of electrically conductive materials with sufficient thermal stability, mechanical stability, etc.) can be used. The core can be made of a metal, alloy (e.g., Kanthal, FeCrAl, NiChrome, titanium-alloy, stainless steel, Chromel, Constantan, Hastelloy, Inconel, Incoloy, Monel, Nimonic, Stellite, Talonite, Vitallium, Brightray, Cupronickel, brass, bronze, superalloy, etc.), and/or other suitable material(s). The core is preferably coated with a protective coating (e.g., passivating coating) such as described for the above embodiment of a resistive heater. The wire coil can extend beyond the core, the core can extend beyond the wire coil, and/or the wire coil length and the core length can be substantially the same. In some variants of the second embodiment, the conduit can be filled with a magnetic fill material (e.g., ferrite; alnico; rare earth magnetic materials such as samarium cobalt, neodymium iron boride, etc.; magnetic soil; magnetic ores or minerals such as magnetite, yttrium iron garnet, iron oxides—optionally doped with aluminium, cobalt, nickel, manganese, zinc, etc.—hexagonal ferrites, spinel ferrites, rhenium ferrite, lead ferrite, barium ferrite, pyrrhotite, etc.; etc.), where the magnetic fill material can additionally or alternatively be heated via the induction coils (e.g., in some variations thereof a core can be excluded from the inductive heater as the magnetic fill material can function as the core).

In a third embodiment, the heater(s) can include a pipe filled with a heated fluid such that the heated fluid can transfer heat (through the pipe where in this embodiment the conduit acts as a pipe for the fluid and as such is preferably fluid tight) to the thermal storage medium. The fluid can be a gas (e.g., air, steam, etc.) and/or a liquid (e.g., water-glycol solution, high temperature heat transfer fluids, molten or liquid metals or alloys, ionic liquids, etc.). In some variants of these embodiments, the heater can also act as a heat exchanger by changing the heated fluid for a low temperature fluid (e.g., specific fluid material, temperature of the fluid, fluid pressure, etc.) that can receive heat from the thermal storage medium.

In a fourth embodiment, the heater(s) can include radiative heaters. The radiative heaters can radiate broadband infrared radiation and/or narrow band infrared radiation (e.g., targeted to an infrared absorption wavelength of the thermal storage medium, conduit, fill material, etc.).

However, other suitable heaters and/or heater arrangements can be used.

The one or more heat exchangers preferably function to receive (e.g., extract, remove, use, etc.) heat from the thermal storage medium. Typically, the heat exchangers are separate from the heater(s). However, in some variants, the heat exchanger(s) can be the same as the heaters (e.g., for fluid heaters).

The heat exchangers can be thermophotovoltaic devices (e.g., gallium antimonide, germanium, layered III-V semiconductors, indium gallium arsenide, etc.), fluid pipes (e.g., steam pipes, air pipes, etc. where in some variants a chemical reaction could be performed directly within the pipes), thermoelectrics or Seebeck generator (e.g., bismuth telluride; lead telluride; alloys of bismuth antimony, tellurium, and/or selenium; silicon germanium alloys; lead alloys; selenium; tellurium; semiconductors or doped semiconductors such as zinc antimonide, tin selenide, skutterudites, tetrahedrites, etc.; etc.), and/or other suitable heat extractor can be used.

Figure 6A:
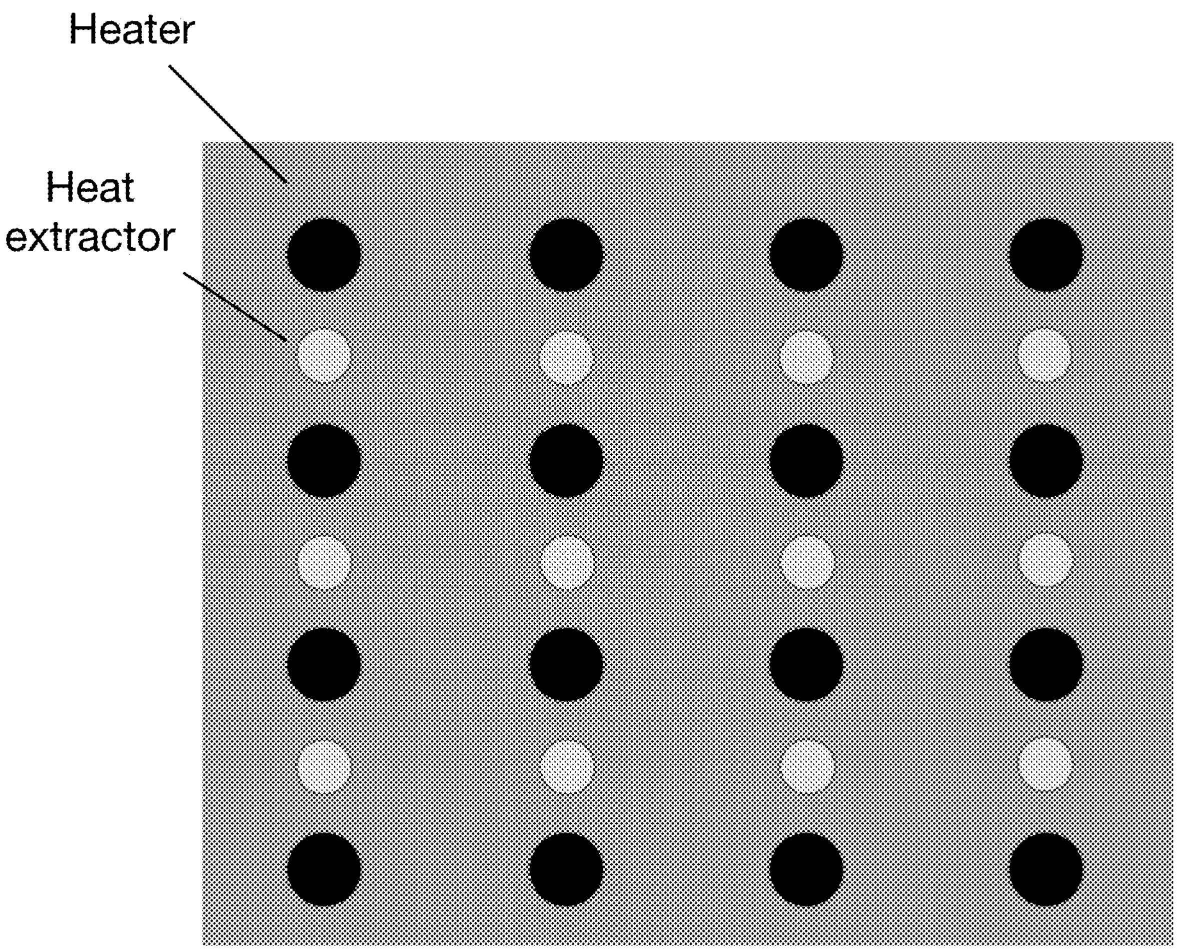
FIGS. 6A-6D are schematic representations of top-down views of examples of the system arrangement (e.g., arrangements of heaters relative to heat exchangers).
Figure 6B:
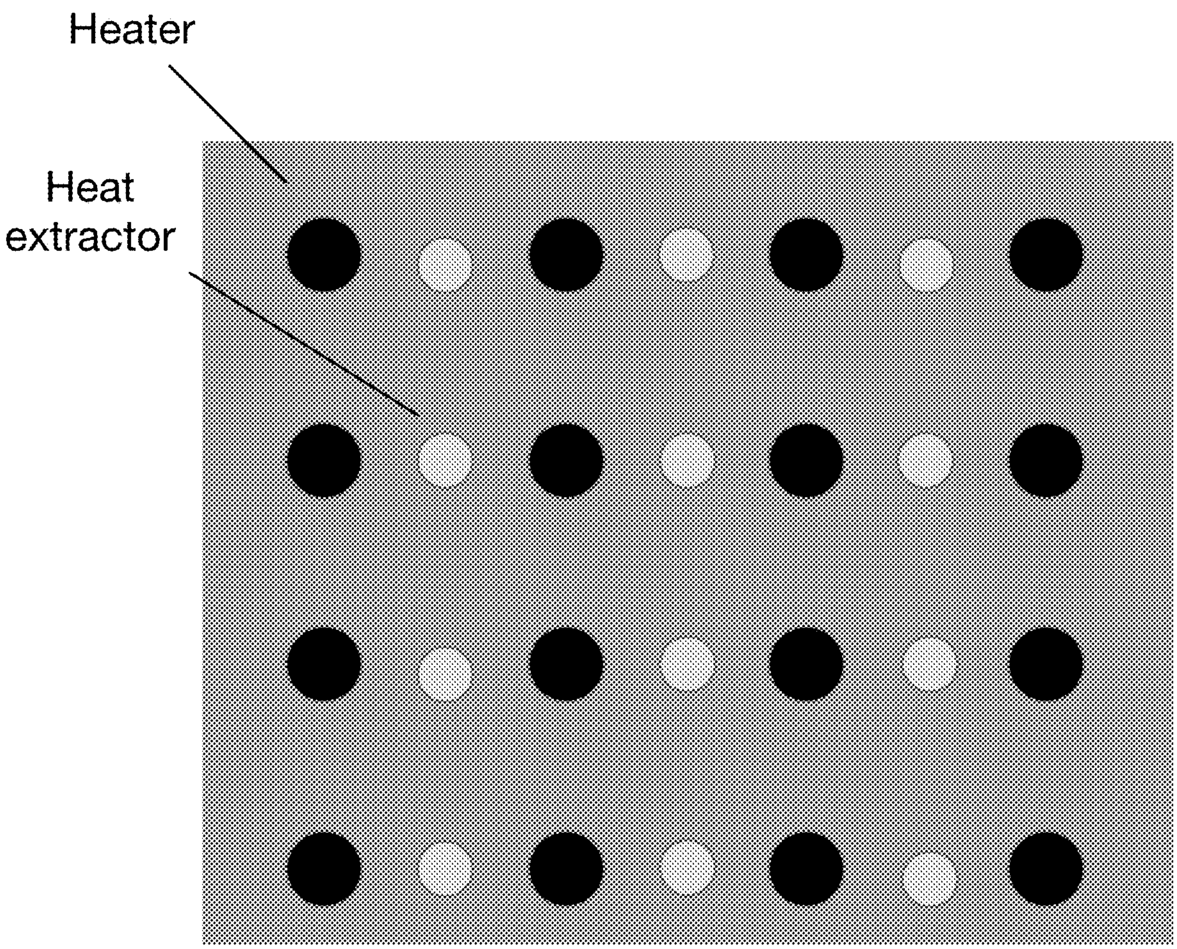
Figure 6C:
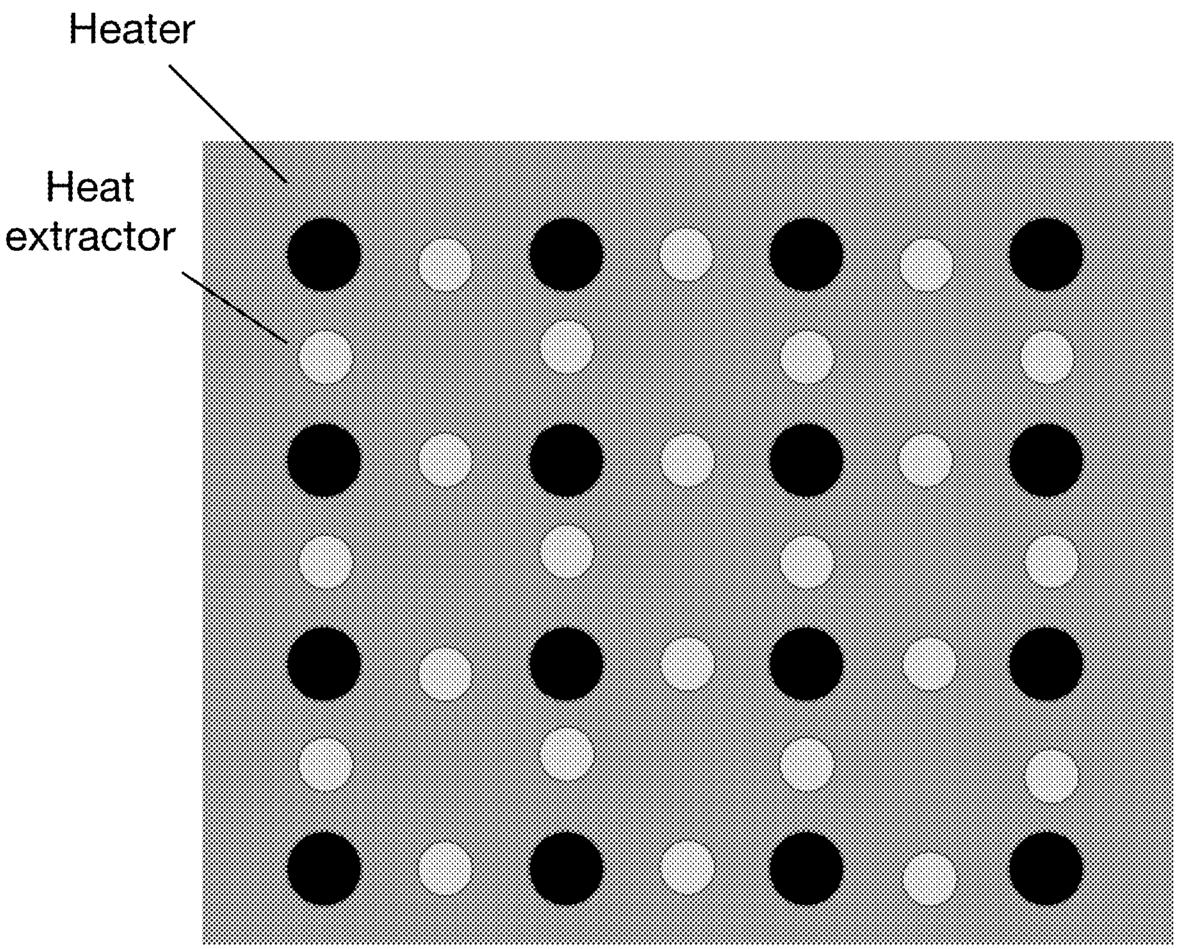
Figure 6D:
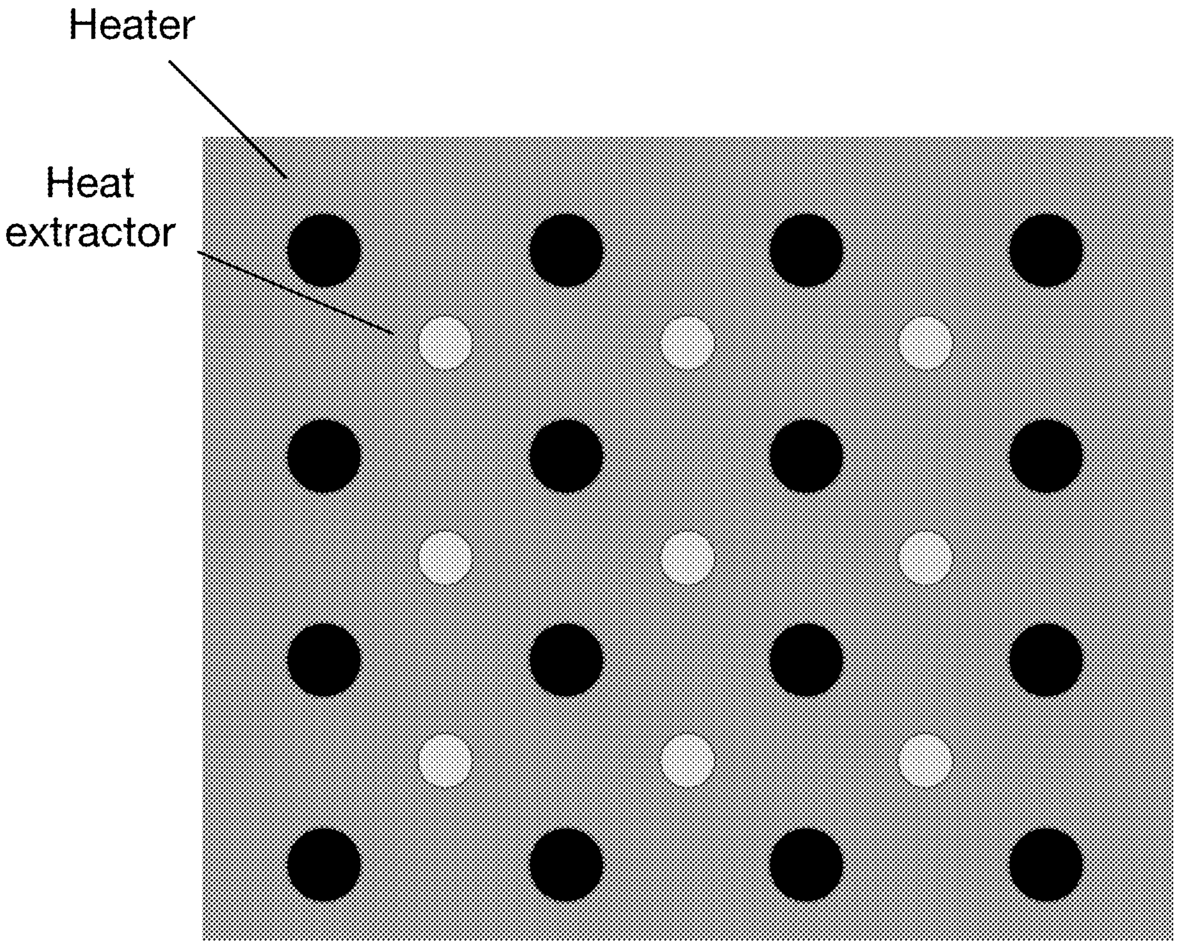

The system can include the same number of heat exchangers as heaters, more heaters than heat exchanger, and/or fewer heaters than heat exchangers. In some variants, a heat exchanger can be arranged between each pair of heaters (as shown for example in FIG. 6A, FIG. 6B, or FIG. 6C), at a node between heaters (e.g., as shown for example in FIG. 6D, with the same or similar grid offset from the heaters in one or more directions), and/or can have other suitable arrangements relative to the heater(s).

Figure 3A:
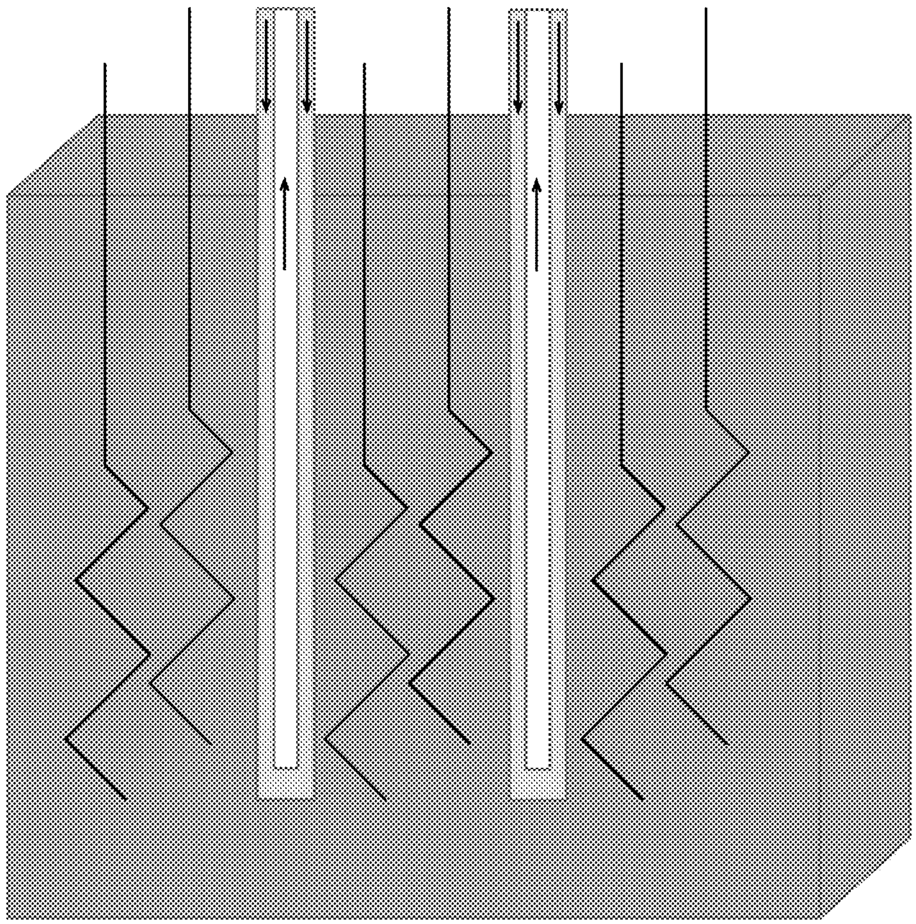
FIGS. 3A and 3B are schematic representations of examples of the systems using a shared inlet/return pipe and a U-shaped respectively heat exchanger.
Figure 3B:
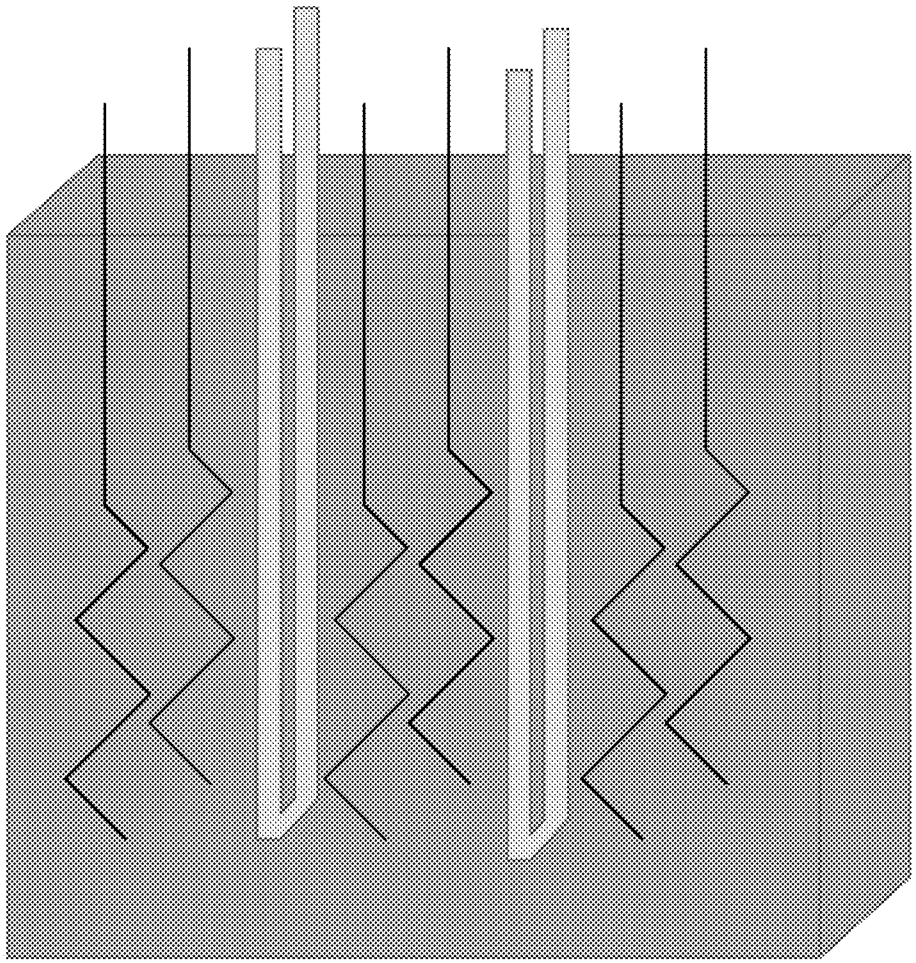

In some variants, a fluid pipe can include both an inlet and a return path (as shown for example in FIG. 3A). In another variant, a U-shaped (as shown for example in FIG. 3B or other bent pipe potentially including additional undulations, tortuous path, boustrophedonic path, etc.) pipe can be used. However, any suitable fluid pipe can be used for a heat exchanger.

The system can include switches, valves, and/or other on/off mechanisms to control operation of the heaters and/or heat exchangers. The on/off mechanisms can be controlled automatically (e.g., using a computing system, based on sensor readings, etc.), manually (e.g., responsive to operator instructions), and/or in any suitable manner.

The system can optionally include one or more sensors that can function to monitor a state or condition of the system. Exemplary sensors include (but are not limited to): temperature sensors, voltmeters, ammeters, multimeters, humidity or hydration sensors, and/or other suitable sensors.

The system can include additional protection mechanisms (e.g., fences, liners, barriers, etc.) that can function to keep flora and/or fauna away from the system, to minimize water ingress into the system, and/or can otherwise prevent ingress of undesirable conditions into the system and/or hinder egress of heat (and/or leachables) out of the system. As a specific example, a tarp or other protective covering (e.g., made of polyvinyl chloride, polyethylene, etc.) can be used to protect a surface of the system from weather (e.g., rain). As another example, a fence or other protective barrier can be installed (e.g., within the thermal storage material) around a perimeter (or portion thereof) of the heaters at a predetermined distance from the edge of the heater array (e.g., at least a threshold distance from the nearest heaters such as 5-20 ft, at a distance based on an estimated maximum temperature, etc.). However, other protection mechanisms can be used.

The system is preferably located above the water table to minimize a risk of water ingress (and subsequent detrimental degradation, electrical shorting, thermal losses from water, etc.). However, the system can be located at or below the water table (e.g., by leveraging proper drainage mechanisms such as French drains, sumps and pits, gravel backfill, etc.; liners or barriers to prevent water infiltration such as clay liners, slurry walls, cofferdams, etc.; etc.).

5. Method

As shown in FIG. 2, a method can include optionally shaping a thermal storage medium (and/or insulator), optionally introducing the heaters and/or heat exchangers into the thermal storage medium, and iteratively: heating the thermal storage medium using the heater(s) and extracting heat from the thermal storage medium using the heat exchanger(s).

Shaping a thermal storage medium S100 (and/or insulator) functions to provide locations for the heater(s) and/or heat exchanger(s) to be introduced into the thermal storage medium, provide additional thermal storage media to adequately cover the heater(s) and/or heat exchanger(s), provide insulation over the thermal storage medium, and/or can otherwise function.

As a first specific example, S100 can include forming (e.g., drilling, augering, boring, trenching, piercing, excavating, piling, digging, layering, tilling, etc.) an earthen material mound covering a heater array and heat exchanger array. As a second specific example, S100 can include digging a trench (where a width of the trench is substantially the same as the conduit size and/or cross-sectional shape) or excavating in earthen material, inserting a heater array and a heat exchanger array into the trench or excavated area, and filling the trench or excavated area with earthen material (where the filled trench or excavated area will generally form a small mound above the original earthen material location resulting from the inserted heater array, heat exchanger array, and/or loosen packing of the earthen material). As a third specific example, S100 can include drilling (or otherwise forming) boreholes (e.g., indentations) in an earthen material (where a borehole diameter is substantially the same as the conduit size and/or cross-sectional shape). In variations of any or all of the specific example of S1000, the earthen material can optionally be compacted (particularly proximal the heater array and/or heat exchangers, which can function to increase a density of the earthen material and the thermal conductivity, specific heat, or other thermal properties of the earthen material) and/or aerated (or otherwise have lowered density particularly at a periphery of the system).

Introducing the heaters and/or heat exchangers into the thermal storage medium S200 preferably functions to insert the heaters and/or heat exchangers into the thermal storage medium. For instance, the heaters and/or heat exchangers can be inserted into boreholes (e.g., indentations) in the thermal storage medium, thermal storage media can be deposited on top of heaters and/or heat exchangers, and/or the heaters and/or heat exchangers can otherwise be inserted into the thermal storage media.

Heating the thermal storage medium using the heater(s) S300 functions to store heat in the thermal storage medium. S300 preferably includes supplying electricity, heated fluid, or other suitable heating mechanism to the heaters such that a temperature of the heaters increases. The thermal storge material can then conduct (though convective or radiative mechanisms may play a role in energy transport as well) heat from the heaters, thereby increasing in temperature. The thermal storage medium can reach an equilibrium temperature before and/or can still not be in thermodynamic equilibrium before S400 is performed.

Extracting heat from the thermal storage medium using the heat exchanger(s) S400 functions to access the thermal energy from the thermal storage medium. The thermal energy is preferably accessed as heat (e.g., heated steam). However, the heat can additionally or alternatively be accessed as electricity (e.g., using a Seebeck generator), pressure, phase change or chemical change, and/or in another suitable manner. For instance, when a fluid (within a fluid pipe) is used to extract heat, the process can be approximated as an isobaric process, an isochoric process, a polytropic process, and/or can be approximated as any suitable process.

S300 and S400 are preferably performed iteratively. The iterations can be according to a predetermined schedule, a fixed frequency, responsive to energy demands and/or availability (e.g., S300 can be performed when excess energy is available and S400 can be performed when excess energy is required), responsive to sensor readings (e.g., thermal storage medium temperature, heat exchanger temperature, heater temperature, moisture in the thermal storage medium, etc.), and/or can occur with any suitable timing. In some situations, neither S300 nor S400 can be performed for a time (e.g., when no energy is available to convert into thermal energy and no need to extract thermal energy exists). However, additionally or alternatively, one or S300 or S400 can be performed and/or S300 and S400 can be performed contemporaneously.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, and/or FPGA/ASIC. However, the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the preceding system and/or method can be used with, in addition to, in lieu of, or otherwise integrated with all or a portion of the systems and/or methods disclosed in the applications mentioned above, each of which are incorporated in their entirety by this reference.

As used herein, "substantially" or other words of approximation (e.g., "about," "approximately," etc.) can be within a predetermined error threshold or tolerance of a metric, component, or other reference (e.g., within 0.001%, 0.01%, 0.1%, 1%, 5%, 10%, 20%, 30% of a reference), or be otherwise interpreted.

As a person skilled in the art will recognize from the previous detailed description and from the figures and claims, modifications and changes can be made to the preferred embodiments of the invention without departing from the scope of this invention defined in the following claims.

A numbered list of specific examples of the technology described herein are provided below. A person of skill in the art will recognize that the scope of the technology is not limited to and/or by these specific examples.

Specific example 1 A method comprising: drilling into earthen material to form a plurality of indentations (e.g., boreholes) in the earthen material, wherein a depth of each indentation of the indentations is at least 10 ft and wherein a width of each indentation of the indentations is at least 2 inches; inserting a resistive heater into each indentation of the plurality of indentations, wherein each resistive heater comprises a conductive region and a Joule heating region, wherein each resistive heater is inserted into the respective indentation with the Joule heating region first; iteratively: heating the earthen material to a temperature between 400° C. and 1000° C. by applying an electric current to each resistive heater; and extracting heat from the earthen material using a heat transfer medium.

Specific example 2. The method of specific example 1, wherein the plurality of indentations are arranged in a grid of indentations.

Specific example 3. The method of any of specific examples 1 or 2, wherein the heat transfer medium comprises steam pipes.

Specific example 4. The method of any of specific examples 1-3, wherein each resistive heater comprises a conduit surrounding the conductive region and the Joule heating region.

Specific example 5. The method of specific example 4, wherein the conduit is filled with silica.

Specific example 6. A system comprising: a dielectric material; a plurality of heaters embedded within the dielectric material, wherein each heater of the plurality of heaters is separated from adjacent heaters of the plurality of heaters by a threshold distance, wherein the plurality of heaters are configured to heat the dielectric material to a temperature above 400° C. in regions between heaters of the plurality of heaters; and a mechanism for recovering the heat from the dielectric material.

Specific example 7. The system of specific example 6, wherein the dielectric material comprises at least one of: soil, dirt, gley, sand, earth, bedrock, gravel, clay, silt, loam, rock, talus, scree, volcanic material, glacial debris, humus, or earthen material.

Specific example 8. The system of any of specific examples 6-7, wherein a heater of the plurality of heaters is a resistor configured to convert electricity to heat via Joule heating.

Specific example 9. The system of specific example 8, wherein the resistor comprises Inconel.

Specific example 10. The system of specific example 9, wherein the Inconel is surrounded by a stainless-steel conduit, wherein a space between the conduit and the resistor is filled with an earthen material.

Specific example 11. The system of any of specific examples 6-10, wherein a heater of the plurality of heaters is an inductive heater configured to convert electricity to heat via magnetic induction.

Specific example 12. The system of specific example 11, wherein the inductive heater is surrounded by a metallic conduit, wherein the metallic conduit is heated via magnetic induction, wherein a space between the metallic conduit and the inductive heater is filled with an earthen material.

Specific example 13. The system of any of specific examples 6-12, wherein a heater of the plurality of heaters comprises a fluid transfer pipe.

Specific example 14. The system of any of specific examples 6-13, wherein the plurality of heaters are arranged in a one-dimensional or two-dimensional grid.

Specific example 15. A method comprising, iteratively: heating a first earthen material to a temperature between 400 and 600° C. using a set of heaters embedded within the first earthen material, wherein the first earthen material is insulated by a second earthen material; and extracting the heat from the first earthen material to provide energy.

Specific example 16. The method of specific example 15, wherein the set of heaters heat the first earthen material when electricity is applied to the set of heaters.

Specific example 17. The method of specific example 16, wherein the set of heaters comprise at least one of a resistive heater or an inductive heater.

Specific example 18. The method of any of specific examples 15-17, wherein an iteration timescale is between hours and months.

Specific example 19. The method of any of specific examples 15-18, wherein the set of heaters are arranged in a rectilinear grid wherein a separation between heaters within a row of heaters is between 2 and 10 feet and wherein a separation between rows of heaters is between 2 and 10 feet.

Specific example 20. The method of any of specific examples 15-19, wherein the first earthen material comprises a greater heat transfer coefficient than the second earthen material.

Specific example 21. The method of any of specific examples 1-5 or 15-20 performed using any of the systems of specific examples 6-14.

Specific example 22. A system configured to perform a method of any of specific examples 1-5 or 15-20.

Specific example 23. A method of operating a system of any of specific examples 6-14.

We claim:

1. A method comprising:

drilling into earthen material to form a plurality of indentations in the earthen material, wherein a depth of each indentation of the indentations is at least 10 ft and wherein a width of each indentation of the indentations is at least 2 inches;

inserting a resistive heater into each indentation of the plurality of indentations, wherein each resistive heater comprises a conductive region and a Joule heating region, wherein each resistive heater is inserted into the respective indentation with the Joule heating region first;

iteratively:

heating the earthen material to a temperature between 400° C. and 1000° C. by applying an electric current to each resistive heater; and extracting heat from the earthen material using a heat transfer medium, wherein the heat transfer medium comprises steam, wherein extracting heat from the earthen material using the heat transfer medium comprises discontinuing flow of the heat transfer medium when the temperature of the earthen material is below a threshold temperature.

2. The method of claim 1, wherein the plurality of indentations are arranged in a grid of indentations.

3. The method of claim 1, wherein the heat transfer medium comprises steam pipes.

4. The method of claim 1, wherein each resistive heater comprises a conduit surrounding the conductive region and the Joule heating region.

5. The method of claim 4, wherein the conduit is filled with silica.

6. The method of claim 1, further comprising compacting the earthen material around the resistive heaters.

7. The method of claim 1, further comprising prior to iteratively heating and extracting heat, drying the earthen material.

8. The method of claim 1, wherein heat substantially only flows into the heat transfer medium from the earthen material.

9. The method of claim 1, wherein electricity provided to the resistive heater is generated using a photovoltaic cell without passing through an inverter.

* * * * *